D. Wolf.
Harvester Droppers.
Nº 46169 Patented Jan 31, 1865
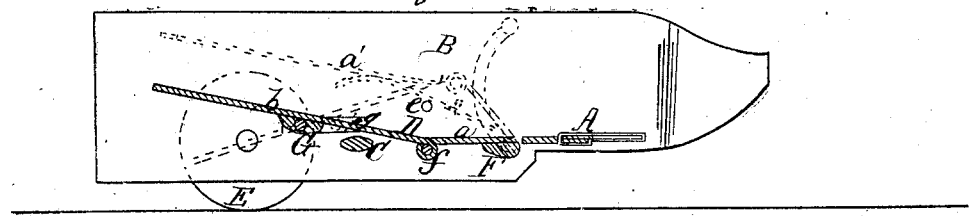
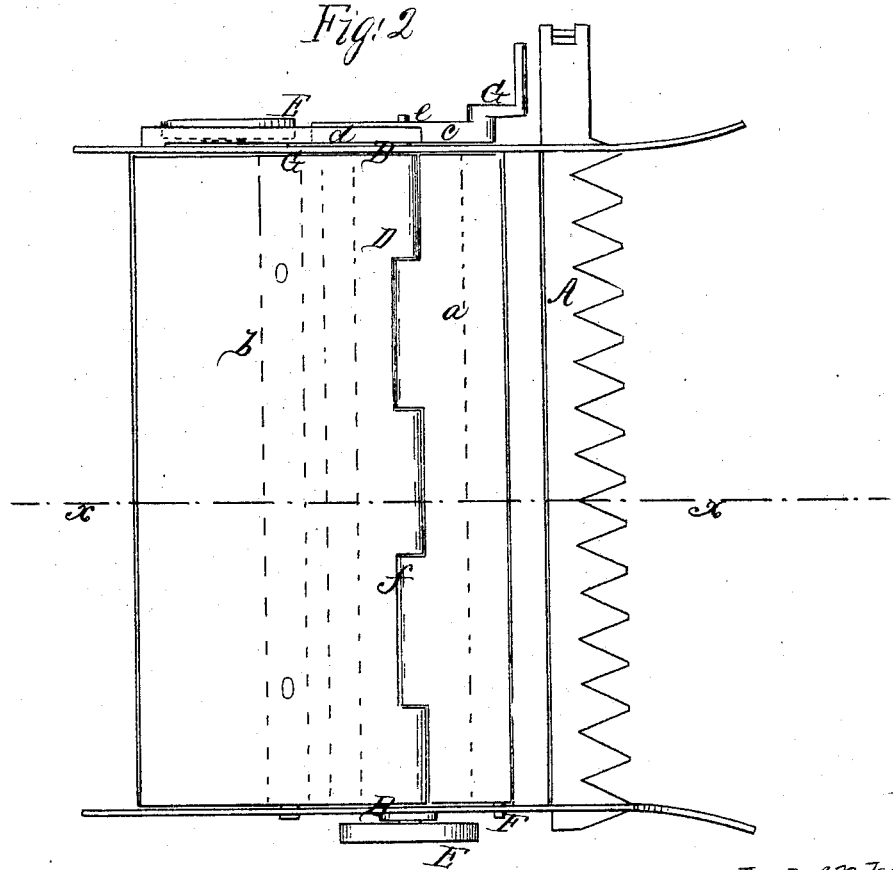
Witnesses:
Henry Morris
Wm. P. McNamara
Inventor:
David Wolf
per Munn & Co
attys

UNITED STATES PATENT OFFICE.

DAVID WOLF, OF LEBANON, PENNSYLVANIA.

IMPROVEMENT IN REAPING-MACHINES.

Specification forming part of Letters Patent No. 46,169, dated January 31, 1865.

*To all whom it may concern:*

Be it known that I, DAVID WOLF, of Lebanon, in the county of Lebanon and State of Pennsylvania, have invented a new and Improved Platform for Reapers; and I do hereby declare that the following is a full, clear, and exact description thereof, which will enable others skilled in the art to make and use the same, reference being had to the accompanying drawings, in which—

Figure 1 is a side sectional view of my invention, taken on the line $x\ x$, Fig. 2; Fig. 2, a plan or top view of the same.

Similar letters of reference indicate like parts.

This invention consists in constructing the platform with a hinge or joint in such a manner that it may be moved or adjusted either by an attendant or by an automatic arrangement so as to discharge the cut grain from it.

A represents the sickle-bar of the reaper, the ends of which are secured to two side pieces, B B, connected by a cross-bar, C, which constitute the frame of the platform.

D represents the platform, which is composed of two parts, $a\ b$, the latter being considerably wider than the former, and both parts extending the whole width of the space between the side pieces, B B.

The frame and platform are mounted on wheels E E—one at each side—and the front edge of the part $a$ of the platform is attached to a bar, F, which is provided with journals at its ends, said journals passing through the side pieces, B B, and allowed to turn freely therein. One of the journals of the bar F is provided with a crank, G, and said journal has a spring, $c$, attached to it, upon which another spring, $d$, bears, the latter being secured to the outer part of one of the side pieces, B, the spring $c$ resting or bearing on a pin or stop, $e$, attached to said side piece.

The front edge of the back part, $b$, of the platform is attached to the back edge of the part $a$ by means of a hinge or joint, $f$, and to the under side of the part $b$ there is attached a bar, G, the ends of which pass through horizontal oblong slots $g$ in the side pieces, B B, and serve as guides for said parts. The slots $g\ g$ are a trifle above the level of the journals of the bar F of the front part, $a$, of the platform, and as the spring $d$ bears upon the spring $c$ the two parts $a\ b$ will have an oblique position relatively with each other, so as to give the platform a concave form, as shown in Fig. 1.

It is designed to have the platform D of such a length that the cut grain upon it will project beyond its back edge and be about balanced on the platform; and it will be seen from the above description that by actuating the crank G, which may be done by the foot of the attendant, so as to raise the back part of $a$ and the front part of $b$, and then suddenly releasing the crank G, so that the parts $a\ b$ may be forced back to their original position, the cut grain will be discharged from the platform.

I do not confine myself to the precise construction herein shown and described, for that may be varied and modified in various ways and the same end attained. The invention is applicable to any of the well-known forms of reapers, and hence is modified to suit the particular kind of reaper to which it may be applied.

I claim as new and desire to secure by Letters Patent—

A platform for reapers, composed of two or more parts connected by a joint or joints and arranged to operate in the manner substantially as herein shown and described.

DAVID WOLF.

Witnesses:
ANTHONY S. ELY,
SOL. W. STROHM.